United States Patent
Becker et al.

(10) Patent No.: US 7,939,781 B2
(45) Date of Patent: May 10, 2011

(54) METHOD FOR MODIFYING THE TOPOGRAPHY OF COATED SHEET METAL USING A LASER BEAM AND COATED SHEET METAL WITH A TOPOGRAPHICAL MODIFICATION OF THIS TYPE

(75) Inventors: Wolfgang Becker, Ulm (DE); Jens Bühler, Stuttgart (DE); Klaus Goth, Sindelfingen (DE); Mike Palmer, Weil der Stadt (DE); Claus-Dieter Reiniger, Remshalden (DE); Daniel Zauner, Ballendorf (DE)

(73) Assignee: Daimler AG, Stuttgart (DE)

( * ) Notice: Subject to any disclaimer, the term of this patent is extended or adjusted under 35 U.S.C. 154(b) by 869 days.

(21) Appl. No.: 10/588,356

(22) PCT Filed: Jan. 27, 2005

(86) PCT No.: PCT/EP2005/000766
§ 371 (c)(1),
(2), (4) Date: Jun. 6, 2007

(87) PCT Pub. No.: WO2005/075141
PCT Pub. Date: Aug. 18, 2005

(65) Prior Publication Data
US 2007/0272665 A1    Nov. 29, 2007

(30) Foreign Application Priority Data
Feb. 3, 2004  (DE) .......................... 10 2004 005 358

(51) Int. Cl.
*B23K 26/00* (2006.01)
*B23K 9/00* (2006.01)
(52) U.S. Cl. .................................. 219/121.64; 219/136

(58) Field of Classification Search .. 219/121.6–121.86, 219/136, 137 R, 137 WM
See application file for complete search history.

(56) References Cited

U.S. PATENT DOCUMENTS

| | | | | |
|---|---|---|---|---|
| 4,626,653 A | * | 12/1986 | Sciaky et al. ............ | 219/121.63 |
| 5,038,016 A | * | 8/1991 | Robertson et al. ....... | 219/121.83 |
| 5,236,763 A | | 8/1993 | Luthi | |
| 5,595,670 A | * | 1/1997 | Mombo-Caristan ..... | 219/121.64 |
| 6,048,255 A | | 4/2000 | Kuo et al. | |

(Continued)

FOREIGN PATENT DOCUMENTS

| | | |
|---|---|---|
| DE | 44 07 190 A1 | 7/1995 |
| DE | 199 47 719 A1 | 4/2001 |
| JP | 07 155974 A | 6/1995 |

(Continued)

*Primary Examiner* — Sang Y Paik
(74) *Attorney, Agent, or Firm* — Patent Central LLC; Stephan A. Pendorf

(57) ABSTRACT

In many cases, the coating material of coated sheet metal has a significantly lower boiling point than the sheet metal material. Thus, an explosive vaporization of coating material can occur when sheet metal of this type is joined by welding, negatively affecting the quality of the connection. To improve the connection quality, narrow gaps are created by means of spacers, allowing the vaporized coating material to escape through said gaps. The spacers are created e.g. by the laser radiation of the sheet metal. The aim of the invention is to reduce the variations in distance between the sheet metal sheets by the appropriate shaping of the spacers. This is achieved by a method, in which the laser beam executes a movement comprising transverse and longitudinal components through and/or around the center of its processing surface. This creates a topographical modification with a spherical form, i.e. with an apex radius that is greater than the height of said topographical modification.

13 Claims, 1 Drawing Sheet

U.S. PATENT DOCUMENTS

| | | | |
|---|---|---|---|
| 6,483,069 B2 * | 11/2002 | Coleman et al. | 219/121.3 |
| 6,670,571 B2 | 12/2003 | Dance | |
| 6,740,845 B2 * | 5/2004 | Stol et al. | 219/121.64 |
| 2003/0230559 A1 | 12/2003 | Briand et al. | |

FOREIGN PATENT DOCUMENTS

| | | |
|---|---|---|
| JP | 11 047967 A | 2/1999 |
| JP | 2003-311453 | 11/2003 |
| WO | WO 99/08829 A1 | 2/1999 |

* cited by examiner

METHOD FOR MODIFYING THE TOPOGRAPHY OF COATED SHEET METAL USING A LASER BEAM AND COATED SHEET METAL WITH A TOPOGRAPHICAL MODIFICATION OF THIS TYPE

CROSS-REFERENCE TO RELATED APPLICATION

This application is a national stage of PCT/EP2005/000766 filed Jan. 27, 2005 and based upon DE 10 2004 005 358.8 filed Feb. 3, 2004 under the International Convention.

BACKGROUND OF THE INVENTION

1. Field of the Invention

The invention concerns a process for laser machining a coated sheet metal and a coated sheet metal. A process and a sheet metal of this generic type are already known from DE 44 07 190 A1.

In the case of many coated sheets, in particular galvanized or zinc coated sheet metal as employed in the automobile industry, the coating material exhibits a significantly lower melting point than the melting point of the sheet material. Accordingly, during laser welding of this type of sheet, explosive-like vaporization of coating material can occur in an overlap joint, which strongly compromises the quality of the joint.

For improving the joint quality it has already been proposed to use spacers to produce a narrow gap between the sheets, so that the vaporized coating material can escape. Suitable crater-shaped spacers can be produced according to JP 11-047967 by laser radiation of the surface. According to DE 44 07 190 A1, nub-like spacers can be produced using a pulsed laser beam. The possibility of influencing the geometry of the spacers is not disclosed.

The primary disadvantage therein is that the spacers produced in this manner are relatively pointy. As a result, they relatively easily penetrate—depending upon the applied forces—and enter the adjacent sheet metal, or themselves become deformed, whereby undesired deviation in sheet spacing occurs. In the case of thin sheet metal, the nubs can cause raised impressions on the opposite side of the sheet metal being spaced.

The task of the present invention is to reduce the deviations in the sheet spacing by suitably shaping the spacers.

2. Description of the Related Art

The invention, with regard to the process to be provided, is inventively solved thereby, that on a least one side of at least one coated sheet metal at least one topographic change projecting from the surface is produced by means of a laser, wherein the laser beam produces the at least one topographic change, by carrying out a movement with transverse and longitudinal components through and/or about the center of a processing surface.

The advantage of this design is comprised therein, that a movement of the laser beam occurs within the interaction zone of the melt, so that in addition to the mixing induced by the heating, it excites or quasi stirs the melt. This leads thereto, that the resulting topographic change becomes more "spherical" shaped at it's apex, so that it exhibits an apex radius that is greater than the height of the topographic change. This type of topographic change is more suitable as a spacer than those previously known, since, due to its spheroid shape, it is less likely to press into the opposite sheet metal or itself become deformed, and thus less undesired deviations in sheet spacing would occur. Besides this, even in the case that the sheet metal is thin, no imprints are created by the topographic changes on the opposite side of the sheet metal being spaced. Further, coated sheets with the topographic changes produced in the inventive manner exhibit an improved corrosion resistance compared to those produced by previously known methods. On the one hand, a spherical peak is less likely to penetrate into the sheet metal to be spaced apart and thus causes little or no damage to the coating. On the other hand, the depression of the sheet metal, from which material of the projecting topographic changes are formed, is fundamentally flatter in shape than those produced by known methods, and thus has less of a tendency to harbor moisture (less capillary effect).

It is particularly preferred when the laser beam is guided on the surface by means of a scanner device. The scanner device is a particularly rapid and flexible beam deflection device, for example a mirror system (comprising at least one single- or multi-access controllable pivotable mirror) or also acousto-optic modulators.

SUMMARY OF THE INVENTION

The great advantage of the inventive process, in comparison to that proposed in JP 11-047967, is comprised therein, that the scanner device moves evenly relative to the surface of the sheet and thereby the scanner device directs the laser beam for a short processing time on to the processing surface and then very rapidly to a different processing surface. Thereby, the time necessary for repositioning of the laser beam is almost completely dispensed with. Therewith, a very high utilization of the laser system is made possible. In contrast to this, in the case of a conventional laser system such as for example that employed in JP 11-047967, a laser beam is directed to a processing surface through a rigid lens system. For transitioning to a different processing surface, the lens system must be moved relative to the component, and during this time the laser must be switched off. Besides this, the position and arrangement of the topographic changes are freely programmable within the processing area of the laser scanner. In comparison to the rigid lens system, the laser scanner need not be repositioned over each of the individual topographic changes, but rather, can in advantageous manner be steered along an optimal track between the topographic changes. These differences produce very different processing times: by means of a laser scanner the production of 30 suitable topographic changes is possible in approximately 0.3 seconds, while a conventional system requires approximately the ten-fold processing time and is beyond this is much more limited with respect to the possible path of movement, while a scanner device in contrast can maneuver the beam easily and extremely rapidly along all of inventive movement paths.

In one advantageous embodiment of the inventive process the at least one sheet metal is a high strength steel. The term high strength steel refers to steels with a tensile strength of <350 Mpa, in particular TRIP- and dual-phase steels (for example, TRIP 700, DP600). Tests have shown that it has not been possible for form topographic changes usable as spacers in this type of high strength steel using the known processes—although however it is now possible with the inventive process.

In a further advantageous embodiment of the inventive process, the laser beam is controlled discontinuously with respect to its power and/or speed profile, that means, power and/or speed of the beam guidance are not constant over the total processing duration, but rather exhibit at least two different values. For example, the power of the laser beam is elevated at the beginning of its movement for production of the topographic change and at the conclusion is lowered. Alternatively, the speed in the vicinity of the processing center is controlled to be lower than at the periphery. These changes of the laser processing of the sheet metal also result in controllable differences of geometry of the topographic changes.

In an advantageous embodiment of the inventive process, the laser beam is not focused on the surface. Preferably the focus is located spaced apart from the surface of the sheet metal to be processed, such that the illumination surface of the laser exceeds the focus surface by at least 50%, preferably 200%. A surface heating of this type evens-out the process of melting the coating and sheet metal and aids in the formation of suitable topographic changes.

In a further advantageous embodiment of the inventive process, the laser beam describes in its movement an ellipse, a rosette, or a fermat figure. The latter is described by the polar equation (1):

$$r^2 = a^2 \theta, \ r=\text{Radius}, \ \theta=\text{Polar angle}, \ a=\text{Constant} \quad (1)$$

The advantage of the laser beam guidance along this type of FIGURE lies in the suitable "spheroid" geometry of the resulting topographic changes.

In a further advantageous embodiment of the inventive process, the laser beam produces at least one topographic change on the opposite side of at least one sheet metal, in that this sheet is melted all the way through in its processing surface. For this, an appropriate processing time until the melt-through is programmed, or a passage-through sensor is provided, which controls the processing time. This embodiment makes possible a further process acceleration in the case of the welding-together of multiple sheets. In the process according to JP 11-047967, first a single sheet is oriented, and then topographic changes are introduced upon this sheet; thereafter a further sheet is supplied and oriented relative to the first, and then both are pressed together and welded. It is however more advantageous to orient both sheets together without pressing against each other. With the absence of pressing together a sufficient minimum gap between the sheets remains for most applications, it could however also be produced by means of a suitable positioning device. Thereafter, topographic changes are introduced in this advantageous embodiment of the inventive process through one or through both of the metal sheets. Thereafter, the sheets are pressed together and welded to each other. In consideration of the high speed of the available scanner devices used in the production of the topographic changes, the savings in the positioning process represents a substantial savings in time.

In a further advantageous embodiment of the inventive process, at least one additional sheet is brought into contact with at least one coated sheet in such a manner that at least one projected topographic change brings about the formation of a gap between at least two sheets, and that the at least two sheets are welded to each other in the area of the at least one gap, in such a manner, that vaporization products occurring during welding can escape via the at least one gap. The possibility of escape for the vaporization products ensures a substantially higher quality of the weld seam.

In another advantageous embodiment of the inventive process, at least two sheets are welded to each other in such a manner, that the resulting weld seam welds over the previously produced at least one topographic change, at least in part.

Each topographic change of this type represents an injury to the coating, since this is vaporized as a consequence of the laser radiation and the blank sheet metal remains. In particular, a zinc coating (galvanizing) in automobile manufacturing serves as corrosion protection. Each injury can represent a nucleus for corrosion. A welding seam however also represents an injury of this type, but it is however indispensable for joining. By driving the weld seam over the topographic changes the seam at least in part replaces these, the number of possible corrosion nuclei is reduced, and therewith the risk of corrosion is reduced. For a subsequent corrosion protection treatment, in particular galvanization, the form of the topographic change is critical: in accordance with the invention an evenly-contoured peak is formed; in accordance JP 11-047967 a crater is formed. A peak exhibits a smaller surface area than a crater formed with the same amount of material and therewith presents less of a surface for attack with regard to corrosion. Beyond this, a peak can be galvanized from all sides even in the case of joined sheets. A crater is, however, covered over by a sheet laying thereover, and can not be internally galvanized. Moisture could remain in the inside of the crater following the joining of the sheets, and the topographic change becomes a corrosion nucleus.

The task with regard to the sheet metal to be produced is inventively solved thereby, that it exhibits at least one topographic change projecting from the surface, of which the radius of the tip is greater than the height of the topographic change. Therein, the height is defined as the elevation between the tip of the topographic change and the lowest point in the recess of the sheet, from which the material for the projecting topographic change has been obtained.

This type of topographic change exhibits the above described advantages.

In another advantageous embodiment of the inventive sheet, the tip radius and height of the topographic changes exhibit a relationship of at least 2 on 1. From this a strong "sphericity" results and therewith a reinforcement of the mentioned advantages.

In an alternative or additive embodiment of the inventive sheet, which likewise exhibits topographic change projecting from the surface, differs in that it is however comprised of a high strength steel.

Tests have shown, that no topographic changes usable as spacers could be produced using the previously known processes—although however with the inventive process, in which the laser beam is moved, such spacers could be produced.

BRIEF DESCRIPTION OF THE DRAWINGS

The inventive process and the sheet metal will be described in greater detail on the basis of five illustrative embodiments.

The FIGURE shows schematically and not-to-scale an inventively produced topographic change, which on its tip is shaped "spherically," that is, has a tip radius (r), which is greater than the height (h) of the topographic change. A coating is not shown in the FIGURE, since this only illustrates the processing area of the laser beam, in which the coating has already been vaporized during the production of the topographic change.

Figure 1:
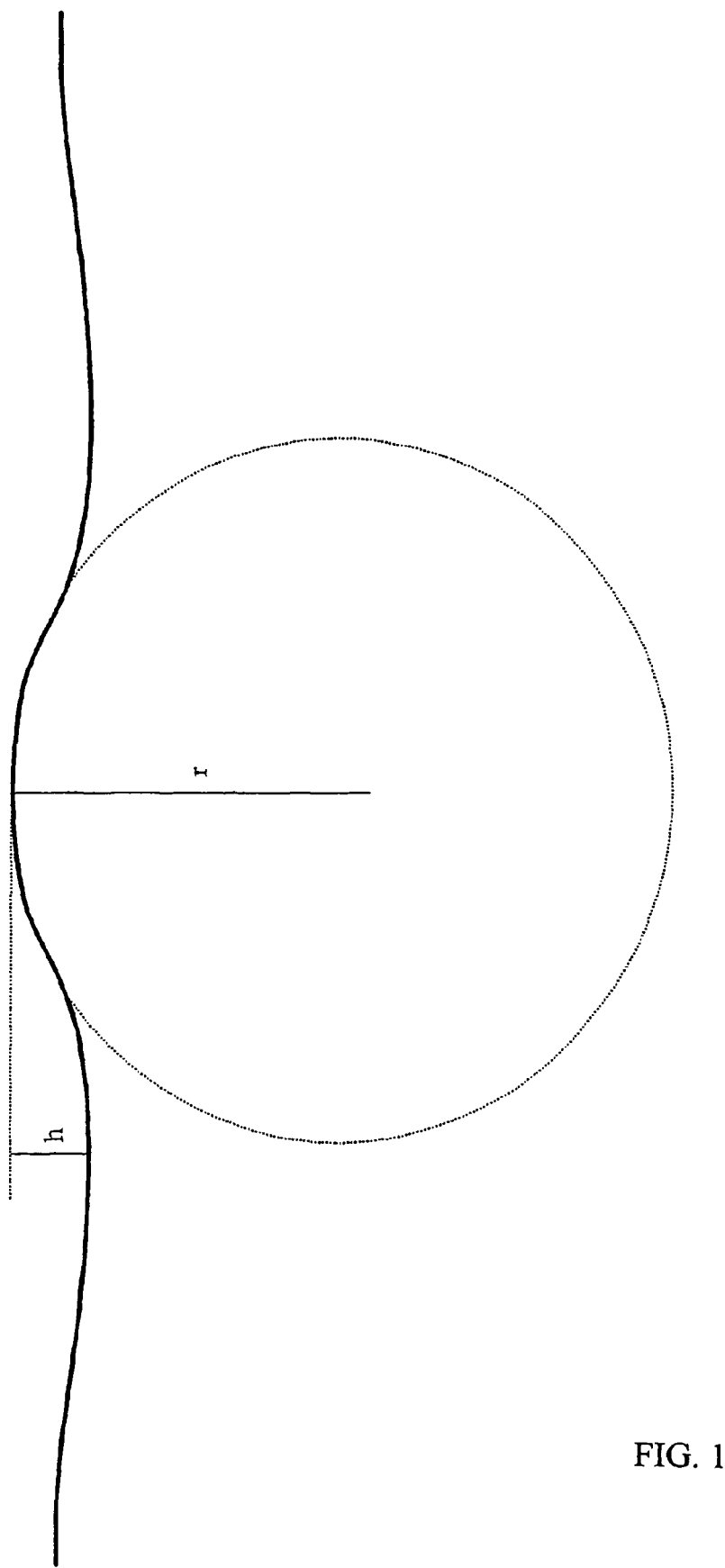

In a first illustrative embodiment an electrolytically zinced steel sheet-metal with a thickness of 0.8 mm is oriented, a scanner device is moved evenly thereover and steers a laser beam sequentially to multiple processing surfaces. The scanner device is comprised of a two-dimensional pivotal computer controlled mirror system. The scanner device is distanced approximately 320 mm from the surface of the sheet metal, the laser focus is approximately 20 nm above the upper surface. The scanner device guides the laser beam with a processing speed of 1.25 m/min over a processing surface. In the last micrometers prior to reaching the actual processing surface the laser power is increased within a span of 5 ms to a processing power of 3.5 kW. Thereafter the scanner device guides the laser beam in a circular manner over the coated sheet surface for production of the topographic change. The circle has a diameter of 0.12 mm. 24 ms are needed for the processing. After describing the circular path, the scanner device steers the laser beam to the next processing surface. After leaving the actual processing surface the laser power is reduced within a span of 5 ms again to the pre-determined value. By the circular movement of the laser beam within the interaction zone of the melt, that is, a movement with lateral and longitudinal components, the melt, in addition to being mix by the induced heating, is supplementally excited or stirred by the moving laser. This leads thereto, that the resulting topographic change is more "spherical" at its tip, that is, exhibits a tip radius, that is greater than the height (140 um) of the topographic change. This is supported by the defocusing of the laser beam, since thereupon the warming of the processing surface occurs more evenly over a broader processing surface. Therefrom, there results a more even vaporization of the coating and the formation of a topographic change in the shape of a even-contoured peak in a flat recess of the sheet. After production of the required number of topographic changes, a second sheet is provided and oriented and thereafter the two are pressed together and welded to each other.

In a second illustrative embodiment, sheets of the same material but with a thickness of 1.2 mm are employed. With this type of sheet, a wider separation between the two sheets of up to 0.3 mm was permissible for the formation of a good weld seam. These sheets are to be subjected to a cathodic dip-coating following welding. For this, a minimum gap of 0.2 mm is necessary. For this reason, some of the previously mentioned laser parameters are changed: the circle diameter is 0.11 mm, the processing speed of the laser beam is 0.7 m/min, and the processing time is increased to 36 ms. From these parameters, topographic changes result with a height of 220 umm, which projects 200 umm above the sheet so that the desired gap is set.

In a third illustrative embodiment, two electrolytically zinced steel sheets with a thickness of 1.2 mm are provided superimposed and spaced apart. The laser beam exhibits a power of 3.5 kW and a processing speed of 7 m/min. The laser beam is guided by the scanner device in such a manner, that it describes a spiral circling about and narrowing towards the center of the processing surface, with an initial diameter of 1.2 mm, whereby it reaches the center after 5 revolutions. For this it requires a processing time of 100 ms. By the spiral shaped movement from outside towards inside there occurs a more even formation of the topographic change on the side of the sheet metal opposite to the laser in the shape of an evenly contoured peak. After production of the necessary number of topographic changes, the two sheets are pressed together and welded to each other. Therein the weld seam is guided over at least several of the topographic changes.

DETAILED DESCRIPTION OF THE INVENTION

In 1.5 mm thick sheets, a larger spiral radius of 1.6 mm is necessary, and for the path to the center, 7 revolutions are necessary. Thereby the processing time is increased to 160 ms per topographic change on the side of the sheet metal facing away from the laser.

In a fifth illustrative embodiment, an electronlytically zinced TRIP 700 steel sheet metal with a sheet metal thickness of 1.0 mm is oriented, and a scanner device is moved evenly there-over while steering a laser beam sequentially to multiple processing surfaces. The scanner device is spaced approximately 300 mm from the surface of the sheet, the laser focus is on the surface. A scanner device guides the laser beam with a processing speed of 8 m/min to a processing surface. In the last micrometers prior to reaching the actual processing surface, the laser power is increased within a time span of 5 ms from a basic power of 1.9 kW to a processing power of 2.2 kW. Thereafter, the scanner device guides the laser beam circularly over the coated sheet metal surface for production of the topographic change. The circle has a diameter of 1.8 mm. For this processing, 70 ms are necessary. After carrying out the circular path, the scanner device guides the laser beam to the next processing surface. After leaving the actual processing surface, the laser power is decreased within a time span of 5 ms to the previously indicated value. By the circular movement of the laser beam within the interaction zone of the melt, that is, the movement with lateral and longitudinal components, the melt is supplementally excited to mixing by the induced heating or is quasi stirred. This leads thereto, in the case of this high strength TRIP 700 steel sheet metal, that a crater shaped topographic change is formed, of which the "spherical" walls serve as spacers. After production of the necessary number of topographic changes, a second TRIP steel sheet metal is provided and oriented and thereafter the two are pressed together and welded to each other.

The inventive process has proven itself in the embodiments of the above described examples as particularly suited for laser welding of coated sheets, and particular of high strength steel, in the automobile industry. In particular, substantial advantages with regard to processing time can be achieved. The corrosion protection can also be improved by the improved shape of the topographic change and by the provision of the weld seam over at least a part of the topographic changes.

The invention is not limited to the above described illustrative embodiments, but rather can be broadly applied.

Thus it is conceivable for example that the scanner device system is replaced by an acoustic-optical modulator. Further, it is possible that in the place of guiding the laser scanner over the component surface, the component is moved below a stationery scanner. In certain cases, scanner and component can carry out a coordinated movement relative to each other.

Further, the distance of the scanner device to the sheet metal and the degree of the defocusing or the mentioned movement pattern are not particularly critical and can be adapted depending upon requirements, for example to the laser power or the material of the sheet and/or coating. Supplementally, it can be advantageous to vary the laser power in a suitable manner during radiation.

Now that the invention has been described, We claim:

1. A process for laser machining of coated sheets, in which at least one topographic change projecting from the surface is produced on at least one side of at least one sheet metal by means of the laser, comprising:

directing a laser beam to carry out a movement through and/or about the center of a processing surface on the sheet metal with transverse and longitudinal components, in such a manner, that the topographic change exhibits a generally spherical peak with a radius that is greater than the height of the topographic change, wherein the height is measured from the deepest recess of the sheet at the foot of the topographic change to its tip, bringing at least one additional sheet into contact with the at least one coated sheet in such a manner that the at least one projecting topographic change brings about the formation of a gap between the at least two sheets, and welding the at least two sheets to each other in the area of the at least one gap, in such a manner, that vaporization products occurring during welding can escape through the at least one gap.

2. The process according to claim 1, wherein the sheet metal is a high strength steel.

3. The process according to claim 1, wherein the laser beam is controlled discontinuously with regard to its power and/or speed profile.

4. The process according to claim 1, wherein the laser beam is not focused on the surface.

5. The process according to claim 1, wherein the laser beam describes, during its movement, an ellipse, rosette or fermat figure.

6. The process according to claim 1, wherein the at least two sheets are welded together in such a manner, that the resulting weld seam at least partially replaces the previously produced at least one topographic change.

7. The process according to claim 1, wherein the peak radius and height of the topographic change exhibit a ratio of at least 2:1.

8. A process for laser machining of coated sheets, comprising:
- producing at least one topographic change projecting from a surface of the sheet on at least one side of at least one sheet metal by means of the laser,
- wherein the laser beam produces the at least one topographic change by carrying out a movement through and/or about the center of the processing surface with transverse and longitudinal components, in such a manner, that the topographic change exhibits a generally spherical peak with a radius that is greater than the height of the topographic change, wherein the height is measured from the deepest recess of the sheet at the foot of the topographic change to its tip
- bringing at least one additional sheet into contact with the at least one coated sheet in such a manner that the at least one projecting topographic change brings about the formation of a gap between the at least two sheets, and
- welding the at least two sheets to each other in the area of the at least one gap, in such a manner, that vaporization products occurring during welding can escape through the at least one gap.

9. The process according to claim 8, wherein the sheet metal is a high strength steel.

10. The process according to claim 8, wherein the laser beam is controlled discontinuously with regard to its power and/or speed profile.

11. The process according claim 8, wherein the laser beam is not focused on the surface.

12. The process according to claim 8, wherein the laser beam describes during its movement an ellipse, rosette or fermat figure.

13. A process according to claim 8, wherein at least two sheets are welded together in such a manner, that the resulting weld seam at least partially replaces the previously produced at least one topographic change.

* * * * *